Oct. 22, 1935.   A. C. KELLER   2,018,496
RECORDER STYLUS
Original Filed April 18, 1931   3 Sheets-Sheet 1
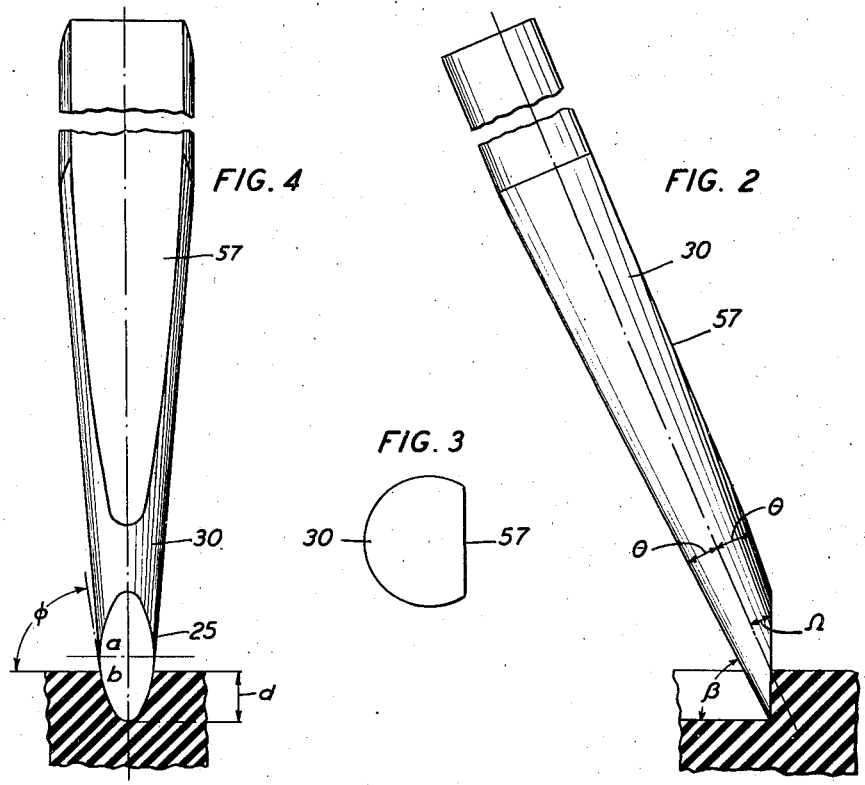
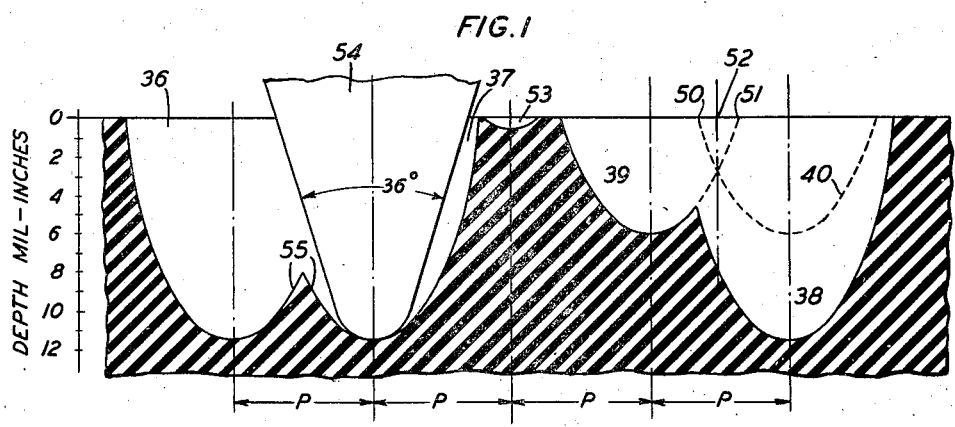
INVENTOR
A.C. KELLER
BY
ATTORNEY Oct. 22, 1935.  A. C. KELLER  2,018,496
RECORDER STYLUS
Original Filed April 18, 1931  3 Sheets-Sheet 2

INVENTOR
A.C. KELLER
BY
ATTORNEY

Oct. 22, 1935.   A. C. KELLER   2,018,496
RECORDER STYLUS
Original Filed April 18, 1931   3 Sheets-Sheet 3

INVENTOR
A. C. KELLER
BY
ATTORNEY

Patented Oct. 22, 1935

2,018,496

UNITED STATES PATENT OFFICE 2,018,496

RECORDER STYLUS

Arthur C. Keller, Mount Vernon, N. Y., assignor to Bell Telephone Laboratories, Incorporated, New York, N. Y., a corporation of New York Original application April 18, 1931, Serial No. 531,026. Divided and this application April 7, 1933, Serial No. 664,875. In Great Britain September 4, 1931

5 Claims. (Cl. 274—38)

This application is a division of application, Serial No. 531,026, filed April 18, 1931, now Patent No. 1,918,271, granted July 18, 1933.

This invention relates to sound recording systems of the hill and dale type and more particularly to recording styli suitable for use in such systems.

The object of the invention is a recorder stylus adapted particularly to cutting records with deep grooves.

In making sound records obviously it is desirable that the undulations representing the sound recorded be as large as possible not only to lessen the degree of amplification required in reproduction, but also to make the reproduction as loud as possible as compared with the loudness of the unavoidable extraneous noises such as the scratch noise of the record. It has long been recognized, however, that in the procedure of cutting deep record grooves there are a number of inherent difficulties which tend to impair the faithfulness of the record as the groove amplitude is increased. One of the most important and well known of these is the fact that the resistance of the record material to the cutting tool increases very rapidly with the depth of cut so that distortion becomes very pronounced for the louder sounds.

Before satisfactory electrical recorders were available, recording was done by acoustic devices which were incapable of performing more than a very slight amount of work on the record material, so that the grooves were necessarily very shallow and the undulations very small. The stylus ordinarily used was a cylinder of .020 inch diameter inclined with respect to the recording surface to cut a groove which was a section of an ellipse with its major axis parallel with the plane of the record. The advent of the present well known damped, lateral type electrical recorders such as that disclosed in Patent No. 1,663,884 to H. C. Harrison, March 27, 1928 greatly increased the amount of mechanical energy available for cutting without excessive distortion. The cylinder stylus discussed above, however, insofar as applicant is aware, was still the preferred stylus for commercial hill and dale work prior to this invention. Such a stylus has a cutting edge only for depths somewhat less than 3 mils but it cannot be used even to this depth because the width of such a 3 mil groove is nearly 20 mils which is double the normal groove spacing. Another limiting factor is that the portion of the stylus behind the cutting face limits the slope of the groove surface, so that the groove depth is limited to much less than 3 mils.

Considerable improvement in these respects may be obtained by using a well known lateral recording stylus for making hill and dale grooves. This stylus is shown in Fig. 5, page 165 of the Bell System Technical Journal for January, 1929. It has a V-shaped cutting face terminating in a circular arc, the included angle being 87° and the tip radius .0022 inch. Good quality hill and dale records having groove depths as much as 3 mils have been made with a stylus of this kind. It was found, however, that if records were cut much greater than 3 mils in depth, there was a very noticeable deterioration in the quality of the reproduction obtained. This distortion was believed to be due to the inability of the reproducer stylus to follow the groove undulations accurately because of curvature limitations incident to the higher amplitudes involved. Applicant, however, has discovered that the limitations of previous systems with respect to recording level have been due in part to the wax breaking away ahead of the recording stylus instead of being cleanly cut and in part to the portion of the stylus directly behind the cutting edge coming in contact with the groove undulations and thereby limitating the depth of cut.

In accordance with the general features of the present invention, the tendency of the wax to break away is overcome by so mounting the stylus that the cutting face is substantially vertical and shaping the face so that the wall of a deep groove is substantially vertical near the surface of the record. The necessary clearance behind the cutting edge of the stylus is obtained by providing a larger back angle between the trailing edge of the stylus and the recording surface than in the styli formerly used. With a stylus of this type driven by a heavily damped recorder, it has been found practical to record sounds without substantial distortion at several times the amplitudes possible heretofore and with a corresponding improvement in the ratio of signal to noise.

The preferred form of the stylus from the standpoint of ease of manufacture has a cutting face in the form of an ellipse adapted to operate with its major axis substantially vertical with respect to the plane of the record. Such a stylus can readily be made by taking a section through a cone which has a small angle of taper to provide the necessary large back angle required. While an elliptical section is best for grooves of large amplitude, as explained more fully below, a parabolic or even a hyperbolic section gives better results than the styli now in common use.

In the drawings:

Fig. 1 is a sectional view of a few grooves of a record according to this invention;

Figs. 2, 3 and 4 are views of the preferred form of stylus for cutting such records;

From the foregoing general description of the invention it should be understood that from the record standpoint there are three principal limitations to the possible depth to which a record groove may be cut:

(1) The decrease in the radius of curvature of the groove undulations with the increase in the amplitude or energy level recorded;

(2) The tendency of the wax to break ahead of the stylus instead of being clearly cut; and (3) The contact of the back portion of the recording stylus with the portion of the groove just cut when the velocity of the recording tool becomes too great with respect to the velocity of the record material.

The first of these limitations is primarily a problem in reproduction, that is, one of keeping the reproducing stylus in contact with the groove at all times. This subject is treated at length in my copending application, Serial No. 402,128, filed October 24, 1929, and in British Patent 363,449 of March 10, 1932, but forms no part of the subject matter to be considered here.

The manner in which the other limitations are overcome according to this invention to an extent which makes possible a very large increase in recording amplitudes will be best understood by first considering the factors underlying the proper design of a recorder stylus for cutting large amplitudes.

Figure 8:
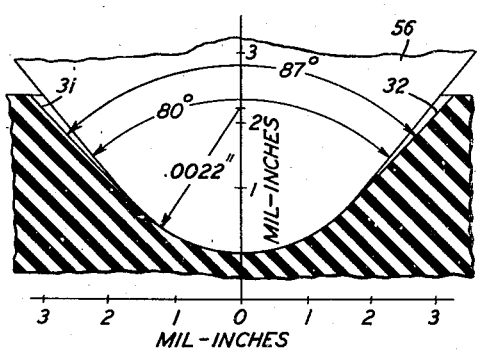
Fig. 8 is a greatly enlarged view of the bottom portion of a groove cut with a standard lateral type recording stylus showing a standard reproducer stylus tracking it.

From an inspection of Fig. 8 it will be seen that a groove cut with a V-shaped recording stylus increases rapidly in width for cuts deep enough to have tangent portions 31, 32 and hence such a stylus, although much better than the cylindrical stylus discussed above, is not well suited to high level work. While this could be overcome theoretically by making the stylus with straight sides or with a very small taper, it must be remembered that the tip radius is only about 2 mils and hence it is very difficult mechanically to make a practical recording or reproducing stylus in this form. Moreover in practice a stylus with straight sides could not be used for cutting deep grooves, for the groove walls would be vertical and hence the cut could not be cleanly made as explained more clearly below. An ellipse with its major axis vertical, however, is a very satisfactory form for the cutting edge and may be easily and accurately made to any required dimensions by sectioning a cone as explained below.

The minimum radius of curvature of the tip of the stylus is determined by various considerations such as the necessary area of contact of the reproducing stylus for permissible wear. A 3 mil radius is large enough for almost any application and usually somewhat less than 3 mils is preferred. A radius of .0022 inch is a value commonly used and the present explanation will be based on this figure but the invention is in no sense limited to a stylus of any particular dimensions. With this radius, $\rho$, fixed a simple relation exists between the major and minor axes of such ellipses as follows:

The equation for an ellipse is $$\frac{x^2}{a^2}+\frac{y^2}{b^2}=1 \qquad (1)$$

Where $a$ and $b$ are the semi-minor and semi-major axes respectively. The radius of curvature $$\rho=\frac{(a^4y^2+b^4x^2)^{\frac{3}{2}}}{a^4b^4} \qquad (2)$$

At the point $x=0$ and $y=-b$ $$\rho=\frac{a^2}{b} \qquad (3)$$

There are, of course, an infinite number of ellipses which satisfy Equation (3), but the choice will necessarily be limited to those which give reasonable values of $a$ (from a groove spacing standpoint) and large enough values of $b$ from the standpoint of the desired groove depth. There are two considerations which in general limit the practical groove depth to a somewhat smaller value than the value chosen for $b$. The first factor will be called the available depth $d$, i. e., the maximum depth for which the stylus has a cutting edge. This value is indicated for the stylus 30 of Fig. 4 by $d$ and it will be readily seen that if it is attempted to cut a groove deeper than that indicated in this figure that the curved surface 25 of the cone projects beyond the cutting edge of the ellipse and will therefore prevent the stylus from cutting a clean groove. This dimension is determined by the choice of the angle of taper of the cone from which the stylus is made and the angle at which the cone is sliced to form the cutting edge. The second factor limiting the possible groove depth to a value somewhat smaller than the major axis, $b$ results from the assumption that the angle $\phi$ of the stylus cutting edge with the record surface at the maximum depth must be slightly less than 90° from the plane of the record in order that the shavings cut from the record may be removed in a clean and satisfactory manner. The maximum depth to which the stylus can be used from this standpoint will be called the "Useful depth".

If for the purpose of illustrating the general method of stylus design it is assumed that 85° is the maximum permissible value of $\phi$, though it will be understood that the limiting value in each case will depend upon a number of factors such as the physical properties of the material and the cutting speeds used, then from Equation (1) the slope at $x, y$, will be $$\tan \phi = \tan 85° = -\frac{b^2 x}{a^2 y} \quad (4)$$

Also from Equation (1) since $y=b-D$ where D is the useful depth as determined by the limiting value of $\phi$ $$\frac{x^2}{y^2} = \frac{a^2\left[1 - \frac{(b-D)^2}{b^2}\right]}{(b-D)^2} \quad (5)$$

Equating (5) with the square of (4) and solving for D $$D = b - \frac{b^2}{\sqrt{a^2 \tan^2 \phi + b^2}} \quad (6)$$

In order to use a stylus to a depth corresponding to a surface angle of 85° it will be necessary to set values of $\theta$, the angle of cone taper and $\Omega$ the slicing angle (see Fig. 2) such that the "available depth" $d$ is at least equal to the useful depth D.

Figure 11:
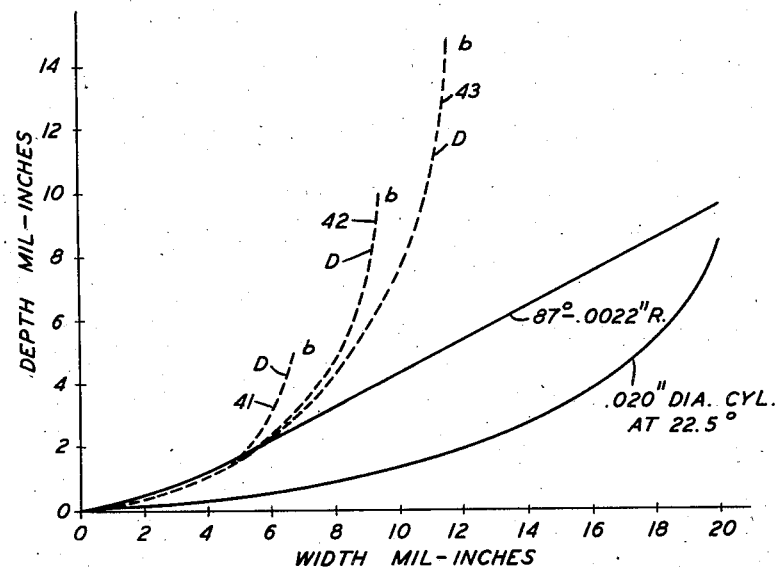
Fig. 11 shows the variation in groove width with groove depth for various forms of styli all having the same assumed tip radius of .0022 inch.

In Fig. 11 curves 41, 42 and 43 show variations in groove width with depth for three elliptical styli up to depths $b$ which are .005, .010 and .015 inch, respectively. For these three cases the values of D from Equation (6) are .00435 inch, .00815 inch and .0116 inch. These values correspond to gains in recording level of 3.2, 8.7 and 11.8 $db$, respectively, as compared with the maximum level practical heretofore.

Figure 12:
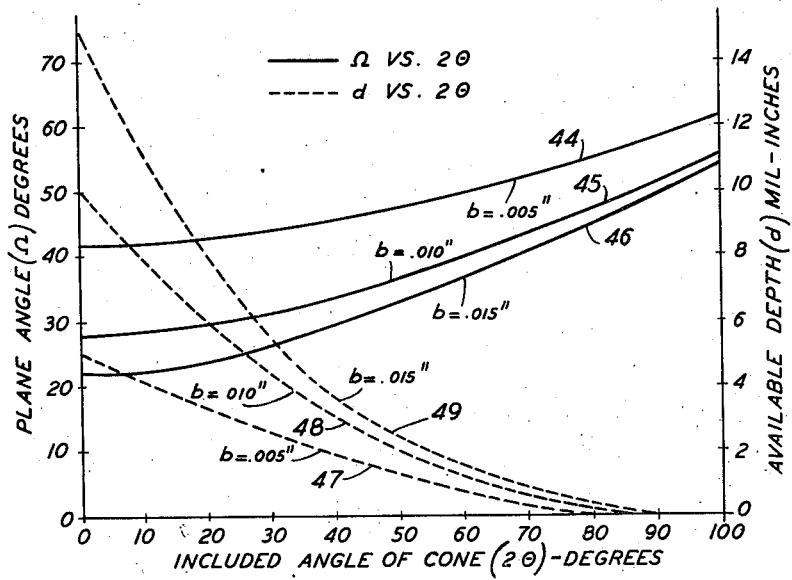
Fig. 12 is a group of curves for readily determining values of $\Omega$ and $\theta$.

Since there is no particular need for an available depth appreciably greater than the useful depth, $d$ may be made equal to D. In Fig. 12 curves for the above three styli are plotted in terms of the double angle of taper $2\theta$. The dotted line curves 47, 48 and 49 give the values of $2\theta$ for various available depths and the full line curves 44, 45 and 46 give the values of slicing angle $\Omega$ required to give an ellipse having the desired value of $b$ with a cone of the taper found from the full line curves. To illustrate the above, values of $d$ (or D) on the full line curves give corresponding values for $2\theta$ of 7.5°, 8.7° and 9.0°. These values of $2\theta$ on the dotted curves indicate that the cones of these tapers should be sliced at angles of 43.5°, 28.5° and 23° to give ellipses having $b$ equal to 5, 10 and 15 mil inches, respectively.

The design of three styli for maximum groove depths of 4.35, 8.15 and 11.6 mils respectively is therefore determined insofar as their ability to cut a smooth groove is concerned. There remains, however, the very important question as to their ability to avoid contact of the surface behind the cutting edge with the surface of the groove since this obviously will prevent the stylus from responding faithfully to the impulses imparted to it by the recorder.

Figure 5:
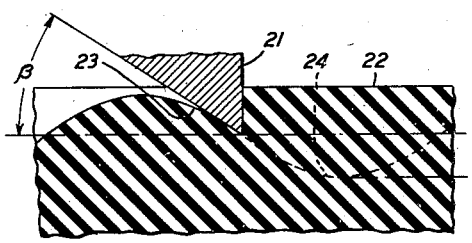
Fig. 5 shows the maximum amplitude of cut with the best known stylus of the prior art.

In Fig. 5 a recording stylus 21 of the well known type previously mentioned is shown cutting a hill and dale groove in a record 22 moving in the direction indicated. The back angle $\beta$ of the stylus is 33° which is the maximum now used insofar as applicant is aware and the amplitude of the groove shown (about 4½ mils) is the maximum for which the stylus will clear the surface 23 as it cuts the portion of the groove indicated by the dotted line 24. This value should not be confused with the 3 mil value given above for this stylus, for the value 4½ mils is from the standpoint of back angle only, whereas it has already been pointed out that other considerations limit the usefulness of the stylus to grooves not over 3 mils deep.

Figure 6:
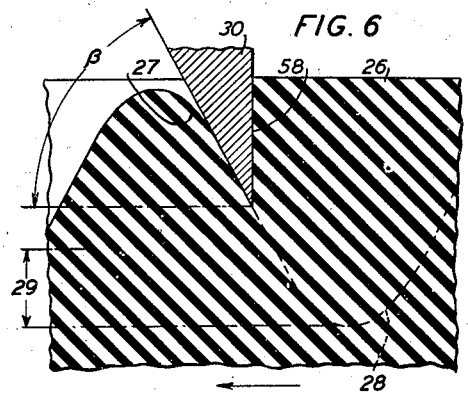
Fig. 6 shows the gain in maximum amplitude obtained by using the stylus of the present invention under the same recording conditions.

In Fig. 6 a stylus 30 according to this invention is shown cutting a groove in the record 26 of a maximum amplitude for which the stylus will clear the portion 27 of the groove already cut as it moves along the dotted line 28. A comparison of the curves of Fig. 5 and Fig. 6 makes plain that the increase in amplitude 29 is made possible by the larger back angle of the stylus 30.

Assuming that the cutting face 58 (Fig. 2) is vertical it follows from the geometry of the figure that $\beta+\theta+\Omega=90°$. For the stylus $b=.015$ inch, which is the preferred structure of the three considered for high level work, $\theta$ is 4½° and $\Omega$ is 23°, hence $\beta$ is 62.50°. Similarly $\beta$, when $b$ is .005 inch and .010 inch, is 42.75° and 57.15°, respectively. In each case therefore the back angle is greater than 40° as compared with 33°, for the greatest back angle of prior styli, as explained above or expressed in another way, the cone is sliced at an angle of less than 50° with one side of the cone.

Figure 10:
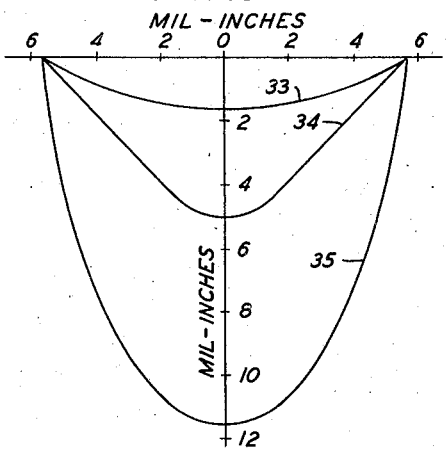
Fig. 10 illustrates the maximum groove depth for a given groove width when using an early form of hill and dale recording stylus, the best known stylus of the prior art and a stylus according to this invention respectively.

The relative groove depth for a given groove width of about 11.2 mils (the commonly accepted practical maximum value for records cut at about 100 grooves to the inch) which can be cut with several types of recording styli are shown in Fig. 10. The curve 33 represents the groove cut by the cylinder stylus of .020 inch diameter, curve 34 the groove which might be cut by the standard 87° V-shaped lateral type stylus if it were not for its limited back angle, and curve 35 a groove of a depth of nearly 12 mils cut with a stylus according to this invention without exceeding the given groove width or introducing objectionable distortion.

The manner in which such a recording stylus can be used to cut a record at very high levels with considerable longer playing time than an ordinary record, is illustrated in Fig. 1. For the uniform groove pitch shown ($p=.00725$ inch corresponding to 138 threads per inch as compared with about 100 threads per inch in standard records) there is a good deal of overlapping of the grooves when maximum amplitudes occur in corresponding portions of adjacent grooves such as 36 and 37. Somewhat less overlapping exists when a maximum amplitude such as 38 occurs opposite a groove 39 representing the average depth or the depth of cut during a stylus interval in the record, but it will be observed that even when silent intervals occur in the same part of adjacent grooves as indicated by 39 and 40, there is still appreciable overcutting as indicated by points 50 and 51 with respect to the mid-point 52 between the groove. A very shallow groove like 53 which is about one half mil deep and represents a satisfactory depth for tracking, does not cut over into a groove of maximum amplitude like 37, but it will be readily seen that such overcutting will occur with any moderate increase in the groove depth. Hence, in a record of this kind the groove separating walls are appreciably below the normal surface of the record material over the greater part of its surface. In systems of the prior art even aside from back angle consideration such a record could not be cut at all since even with the lateral type stylus which gave the greatest groove depth then obtainable, the V groove would entirely cut away the surface material of adjacent grooves. As a result the groove spacing would have to be greatly increased, in the case shown to about 70 grooves per inch with the corresponding loss in playing time.

Heretofore overlapping grooves with the resulting sharp edge separating walls have been found impractical due to unavoidable chipping of the edges in handling the record and making pressings from it. In the present invention, however, the record is intended to be reproduced by a very lightweight low impedance reproducer of the general type disclosed in my copending application referred to above. These reproducers are capable of operating at very low record pressures such as 5 to 15 grams or even less, and of tracking with very small thrust on the side walls of the groove. With such reproducers it is therefore perfectly practical to use a stylus needle, such as 54, which contacts only a small bottom portion of the groove and therefore does not come into contact at any time with the rough surfaces 55 mentioned above. A satisfactory stylus for grooves of the kind illustrated in Fig. 1 is a cone of which the portion entering the groove has a 36° included angle as indicated, and a tip radius of .002 inch which is slightly less than $p$ the tip radius of the elliptical recording stylus.

Figure 9:
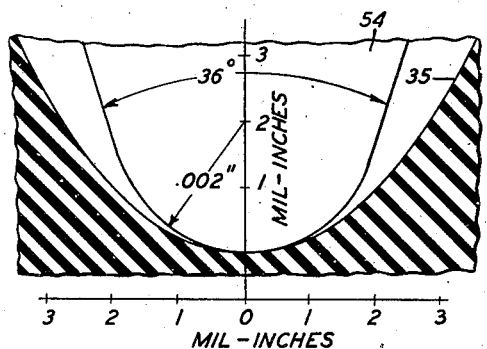
Fig. 9 is a similar view of the bottom portion of a groove according to this invention with the preferred form of reproducer stylus and illustrates particularly the greatly reduced arc of contact.
Figure 7:
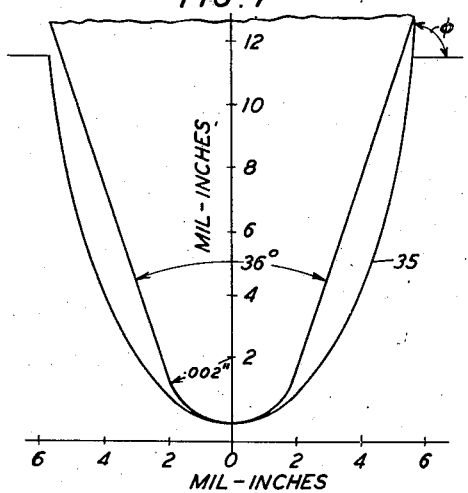
Fig. 7 is a section showing a deep groove cut with the recording stylus of this invention and a reproducer stylus of the preferred form tracking the groove.

The usual form of lateral reproducing stylus is merely a sharp pointed needle which is "worn in" to the contour of the groove by the abrasive in the record material. Such a stylus obviously would be utterly unsuited for playing back original recordings of this kind and would be unsatisfactory even for hard pressing since the point would very soon wear to such an extent that the arc of contact with the groove would be excessive and contact would be made with the upper portion of the groove walls thereby unnecessarily increasing the noise in reproduction. The stylus 54, on the other hand, is made of such material as to be permanent, or semi-permanent, and makes contact with the groove over only about 1½ mils of arc, as more clearly shown in Fig. 9. The pre-contoured lateral stylus 56 of Fig. 8 is typical of the ball point styli which have been used for records with the maximum amplitude possible prior to this invention. These ordinarily operate with a more limited arc of contact than those which merely wear in, due to the included angle being slightly less than that of the V-shaped groove with which they are to be used, but even these styli contact the groove over about 4 mils of arc which is excessive for the purposes of this invention. These defects can not be corrected by reducing the included angle sufficiently to clear the upper side walls of grooves and grinding a smaller tip radius because of mechanical difficulties in manufacture. Although the overlapping of the grooves in Fig. 1 is very pronounced, it will be seen that even in the extreme case of grooves 36 and 37, the top of the separating wall is about 3½ mils above the bottom of the groove. It has already been pointed out in connection with Fig. 9 that the preferred stylus contacts only about 1½ mils of arc at the bottom of the groove and it will be seen from this figure that if the side walls are even one-half mil high, that there is a very generous margin over normal requirements to guard against displacing of the stylus due to abnormal shocks to the reproducing system. As a matter of fact it is quite practical to cut grooves of the depths shown in Fig. 1 when the grooves are spaced even somewhat closer than those shown, for it is found that even when the recording stylus cuts out of the record material entirely for a short distance, lightweight reproducers of the type referred to do not become displaced into an adjacent groove.

In adjusting the stylus in the recorder care must be taken to have the cutting face perpendicular to both the record surface and the direction of the groove. If this is not done, in either case there will be a difference in phase between the top and bottom or between the opposite sides of the groove which will introduce distortion into the record and tend to obliterate the higher frequencies. The stylus mounting can readily be adjusted to make the cutting face perpendicular to the record surface and the correct position of the stylus in the holder is assured if, when the stylus is made, a flat surface 57 is ground in a predetermined relation to the cutting face and the stylus holder is shaped to receive the stylus only in the correct position.

In describing the invention specific dimensions and angles have been given for purposes of illustration but it should be understood that the invention is to be limited only by the scope of the following claims.

What is claimed is:

1. A stylus for cutting deep hill and dale grooves having a conical portion with a double angle of taper less than 10 degrees terminating in an elliptical cutting face extending the full width of the conical portion from the stylus point upwardly for a distance substantially equal to the maximum width of the cutting face and disposed at such an angle to the axis of the stylus that when the cutting face is vertical the back clearance angle is substantially greater than 40 degrees.

2. A stylus for cutting deep, narrow, closely-spaced hill and dale grooves having a conical portion of small taper with a cutting face more than twice as long as it is wide disposed at such an angle to the tapered portion that the back clearance angle is substantially more than 40 degrees when the stylus is mounted with the cutting face in a vertical position.

3. A stylus for cutting hill and dale records having a cutting face in the form of an ellipse disposed at such an angle to the body of the stylus that the back angle is greater than 40 degrees when the stylus is mounted with the cutting face in a vertical position, said cutting face having a cutting edge for hill and dale grooves to a depth substantially equal to the maximum width of the cutting face.

4. A recording stylus for cutting deep, closely-spaced hill and dale grooves having a conical portion with a double angle of taper less than 10 degrees and an elliptical cutting face disposed at an angle of substantially less than 45 degrees to the axis of the conical portion so that it is at least twice as high as it is wide and has a cutting edge for hill and dale grooves to a depth substantially equal to the maximum width of the cutting face.

5. A recording stylus for cutting deep, overlapping grooves having a conical portion with a double angle of taper less than 10 degrees, a cutting face in the form of an ellipse with a major axis at least twice as long as the minor axis and a cutting edge on said face for grooves to a maximum depth substantially equal to their maximum width, said cutting face being disposed at substantially less than 45 degrees to the axis of the cone whereby when the stylus is mounted with the cutting face in a vertical position the trailing portion of the stylus forms a back clearance angle of substantially more than 40 degrees.

ARTHUR C. KELLER.